United States Patent
Balletti et al.

(10) Patent No.: US 7,333,441 B2
(45) Date of Patent: Feb. 19, 2008

(54) METHOD TO CONTROL THE PACKET SWITCHING TRAFFIC IN DIGITAL CELLULAR COMMUNICATION SYSTEMS

(75) Inventors: Alessandra Balletti, Milan (IT); Simona Cavalli, Ispra (IT); Valeria Motolese, Milan (IT)

(73) Assignee: Siemens Mobile Communications S.p.A., Milan (IT)

( * ) Notice: Subject to any disclaimer, the term of this patent is extended or adjusted under 35 U.S.C. 154(b) by 864 days.

(21) Appl. No.: 10/737,963

(22) Filed: Dec. 18, 2003

(65) Prior Publication Data

US 2004/0131037 A1    Jul. 8, 2004

Related U.S. Application Data

(63) Continuation of application No. PCT/EP02/06797, filed on Jun. 19, 2002.

(30) Foreign Application Priority Data

Jun. 29, 2001   (IT)   ................ MI2001A1376

(51) Int. Cl.
*H04L 12/26*   (2006.01)

(52) U.S. Cl. ............... 370/252; 370/331; 455/453
(58) Field of Classification Search ............... None
See application file for complete search history.

(56) References Cited

FOREIGN PATENT DOCUMENTS

| WO | WO 99/13670 | 3/1999 |
|----|-------------|--------|
| WO | WO 99/67902 | 12/1999 |
| WO | WO 01/35586 A1 | 5/2001 |

*Primary Examiner*—Chau Nguyen
*Assistant Examiner*—Dargaye H Churnet

(57) ABSTRACT

It is disclosed a method to control the traffic generated by packet switched services in digital cellular communication networks. The method, enabled by the operator or by radio resource manager request, exploits network controlled cell reselection procedure and is based on the evaluation of the level of occupation of radio resources and, for every GPRS mobile, on the evaluation of the signal strength received both from the serving cell and from the cells adjacent to the serving one. Suitable cells towards which to move the GPRS mobiles are searched by the procedure. GPRS mobiles are then moved towards a candidate target cell through network controlled cell reselection if the cell supports packet switched service and has an occupation level of radio resources lower than a threshold parameter set by the operator on a cell basis.

12 Claims, 2 Drawing Sheets

METHOD TO CONTROL THE PACKET SWITCHING TRAFFIC IN DIGITAL CELLULAR COMMUNICATION SYSTEMS

BACKGROUND OF THE INVENTION

The present invention relates to digital cellular communication systems, and more in particular its object is a method to control the traffic generated by packet switched services in these systems.

In particular, the invention finds application in traffic control in general packet radio service (GPRS, acronym for General Packet Radio Service) of GSM system GSM (Global System for Mobile communications), and the present description shall refer to this application, for clarity sake.

Digital cellular systems like the GSM were initially designed for voice communications, which employs circuit-switching connections in which the user has the exclusive use of a given band for the whole connection time. This technique is not efficient for data traffic, which is typically discontinuous: in practice, a resource assigned to a connection remains unavailable for the other connections even in the periods during which there are no data to transmit and this represents an obvious waste of resources.

The ever growing diffusion of mobile cell phones, and the consequent growing interest to the use of mobile systems also for data traffic (e.g. for file transfer, access to Internet etc.), induced the Standardization Bodies to specify a new switching service data access in GSM networks, the GPRS service. The GPRS service optimises the use of the network and of radio resources for data transmission increasing the capacity of the network in the case of data transmission, in order to have a radio resource allocated to a packet call only during the actual transfer period.

In high traffic conditions, packet switched services and circuit switched services as well, may contribute to get the cell congested from a radio resource point of view. To prevent bottleneck situations, it's possible to move GPRS calls towards adjacent cells with low traffic conditions.

GSM 03.22, GSM 04.60 and GSM 05.08 specifications of ETSI (European Technical Standard Institute) describe a procedure, the cell-reselection, designed to move mobile stations towards a cell offering better reception conditions compared to the serving cell.

The cell reselection is generally controlled by the single mobile stations, which of course do not know the general conditions of the system, and is based on the evaluation of radio conditions and not on a joint evaluation of the cell occupation conditions. This leads to a non efficient exploitation of radio resources, since there could be cells close to congestion, while contiguous cells offer the same satisfactory radio conditions and also, radio resource availability. Furthermore, a procedure not considering the occupation level of the cells, could lead to the choice of an already high traffic cell unable to be the target one, with the side effect to loose the call. Concluding, the cell-reselection controlled by the MS may produce a degradation in the quality of the packet switched service and of the whole network as well.

GSM 04.60 and GSM 05.08 specifications mention the existence of a cell reselection performed on network command employing reception and interference measurements made by the mobile stations and supplied to the base station and having the possibility to substitute the one controlled by the mobile station. However, the specifications do neither give any description of how the network employs the measurements nor of the conditions on which it enables reselection. Moreover, the implementation of reselection on network command is optional and possible solutions are proprietary.

WO-A 99/49598, on which the preamble of claim 1 is based, describes a procedure to re-allocate the GPRS traffic, in which the network forces the cell reselection of mobile stations engaged in packet communications when the serving cell is congested, in order to increase the data traffic that can be managed by the system. The mobile stations potentially candidate to perform the reselection are identified on the basis of fading criteria and by the definition of a set of distance bands from the base station of the serving cell, candidate mobile stations are those for which the intensity of the signals received by the station from at least a contiguous cell exceeds by a given threshold the one received from the serving cell. For each one of said stations, it is evaluated the traffic increase that could be obtained with the reselection towards each one of the possible contiguous cells and the reselection shall concern the couple (or couples) mobile station/destination cell enabling the highest traffic increases.

The known document does not clearly define neither the traffic conditions in the serving cell requested to trig the reselection procedure, nor the precise criterion according to which the intensity of the received signal is evaluated. The only conditions mentioned for traffic seem to suggest that the procedure concerns only cells in congestion situation or cells that anyway cannot accept a new communication. Furthermore, there isn't the evaluation of the traffic conditions of the destination cell, and therefore also in this case there is a high risk that the selected cell cannot accept the transfer, as in the case of reselection controlled by the mobile station. and therefore also in this case there is a high risk that the selected cell cannot accept the transfer, as in the case of reselection controlled by the mobile station.

WO 99/67902 A discloses a method for transferring a communication within a communication system (in particular, mobile assisted handover or cell reselection), in which a remote unit candidate to undergo communication transfer receives from the serving based station a handover candidate list, which list only contains neighbouring base stations supporting the current service required by the remote unit. The need for handover is recognised in conventional manner, by monitoring a signal quality for the communication of the remote unit with the serving base station and with a number of neighbouring base stations. Also this document does not consider the traffic conditions in the target cell, nor it mentions or suggests the possibility that the network forces a communication transfer (and, more particularly, a cell reselection) independently of the occurrence of the conditions that conventionally could cause such a transfer.

WO 01/35586 discloses a method of network controlled handover in a packet switched communication network, intended to dispense the network element providing packets to the base station system with the control of the handover. This document merely suggests that handover can occur because of congestion (of times slots, frequencies or codes) in a cell, with a consequent need for resource renegotiations and mobile redistribution among the cells. The document indicates that the target cell must be able to accommodate the communication in which the mobile to be transferred is engaged, but it considers an environment in which the resources are negotiable and scalable during handover. No indication is provided about the possibility for the base station to force reselection upon reaching a certain traffic threshold (even if no congestion occurs) or for attaining a desired quality of service.

BACKGROUND OF THE INVENTION

Scope of the invention is therefore to offer a packet traffic control procedure where a network controlled cell reselection is made, avoiding the risk that reselection is unsuccessful since the destination cell is overloaded it too.

According to the invention, a method, triggered by the evaluation of radio resources occupation or by quality of service (QoS) criteria, describes a strategy to choose candidate mobile stations to perform the reselection on network command. A candidate MS is a MS for which a candidate cell able to accept it is found. For each MS of a concerned cell, two parameters related to path loss are jointly evaluated. For both parameters the value of the received signal level from the base station of the serving cell and that one from the base station of each adjacent cell is determined; then the mobile stations for which said parameters indicate both a degradation of communication with the base station of the serving cell and a good quality of the communication with the base station of at least one adjacent cell are included in a list of mobile stations candidate to receive a reselection command from the network. The reselection of a candidate mobile station is forced towards a cell supporting the packet switched service and having an occupation level of radio resources lower than a threshold, set by the operator and typical of the cell.

BRIEF DESCRIPTION OF THE SEVERAL VIEWS OF THE DRAWINGS

The invention, together with additional objects and advantages, can be understood from the following description accompanied with the attached drawings, in which.

DETAILED DESCRIPTION OF THE INVENTION

Figure 1:
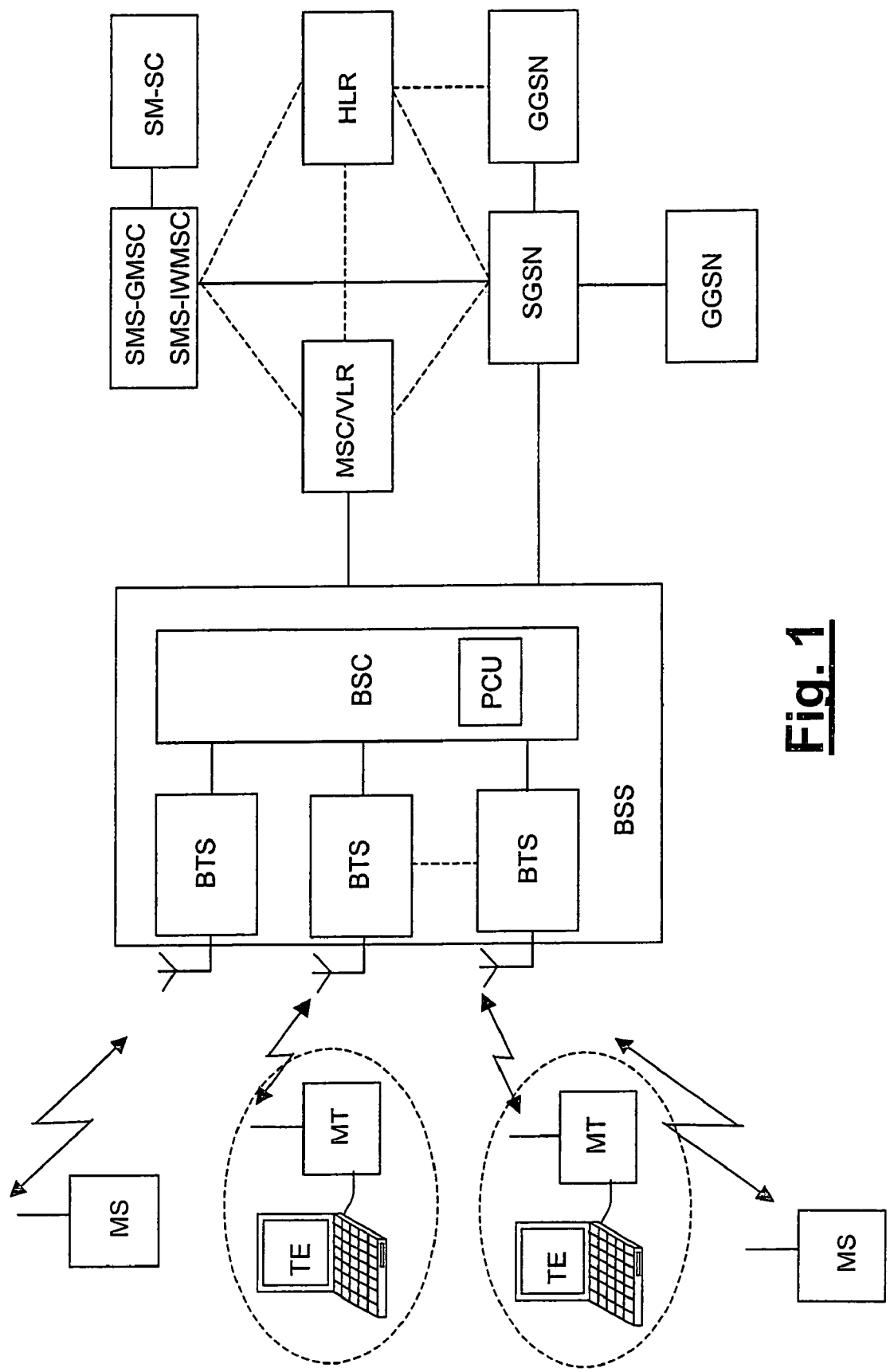
FIG. 1 is a large block diagram showing part of a cellular network with the GPRS service where the invention is employed.

With reference to FIG. 1, we have schematically represented the structure of a cellular GSM communication system supporting both voice circuits and conventional data circuits, circuit switched, and the GPRS service for packet switched service data transmission. MS denotes the mobile stations suitable for voice communications short messages (Short Message Service or SMS), and UE the mobile stations consisting of a data terminal TE (e.g. a laptop computer) and a mobile terminal MT suitable to data packet transmission. The mobile stations served by the different cells communicate with a relevant base transceiver station BTS. BSC is the controller of the base station, which can control a plurality of BTS base transceiver stations, and to which a PCU unit is associated for the control of the GPRS traffic performing the functions foreseen by the invention. The BSC is connected to the Mobile Switching Centre (MSC) for circuit switched services while it is connected to the node SGSN node for what concerns the packet switched services. The SGSN performs, for the GPRS calls the same functions performed by the MSC for the speech calls. HLR is the location register of the stations belonging to the network, containing also information on the users of the GPRS service while the VLR is the visitor location register for MS belonging to other networks. Finally, GGSN is a node enabling the connection of the network to other similar networks (always for the GPRS service) or to other packet switched data networks such as networks employing X.25 or IP protocols. On the contrary, the MSC block enables the connection to fixed telephone networks, including the ISDN networks, and to other BSCs. MSC and SGSN blocks support also the short message service and are connected to the relevant service centre SM-SC, through appropriate interface units known as SMS-GMSC (Short Message Service-Gateway MSC, or access port MSC for SMS) and SMS-IWMSC (SMS-InterWorking MSC, or intervworking interface between MSC and SMS).

The functionalities of the single entities are well known to those skilled in the art and need not to be described with further details that can be found in the specifications for the GSM/GPRS system.

The procedure according to the invention is controlled by the PCU unit and allows the network to identify possible mobile stations engaged in a packet switched communication to which the network can order to perform a cell reselection. The procedure can be enabled:

for traffic reasons, on the basis of the occupation criteria of radio resources available for the GPRS service, defined cell by cell by the network operator; and/or on request of the resource manager sent to a specific cell, for quality of service reasons.

With the first enabling mode, attempts are made to move the traffic from a high traffic cell to a low traffic cell offering good radio reception conditions. This is a measure aiming at preventing a congestion condition in the cells.

The second enabling mode allows to make radio resources available in order to meet some quality of service requirements. In practice, it shall be enabled when radio resources in a cell are not sufficient to accept a new packet switched call with the desired quality of service (e.g. there is not the sufficient number of contiguous time slots to ensure the desired quality of service). Therefore, it is an event-based reselection control, which shall mainly intervene to face shortage of resources situations when the traffic control on traffic basis is not active, but however which could intervene even if the traffic-based control is active.

Figure 2:
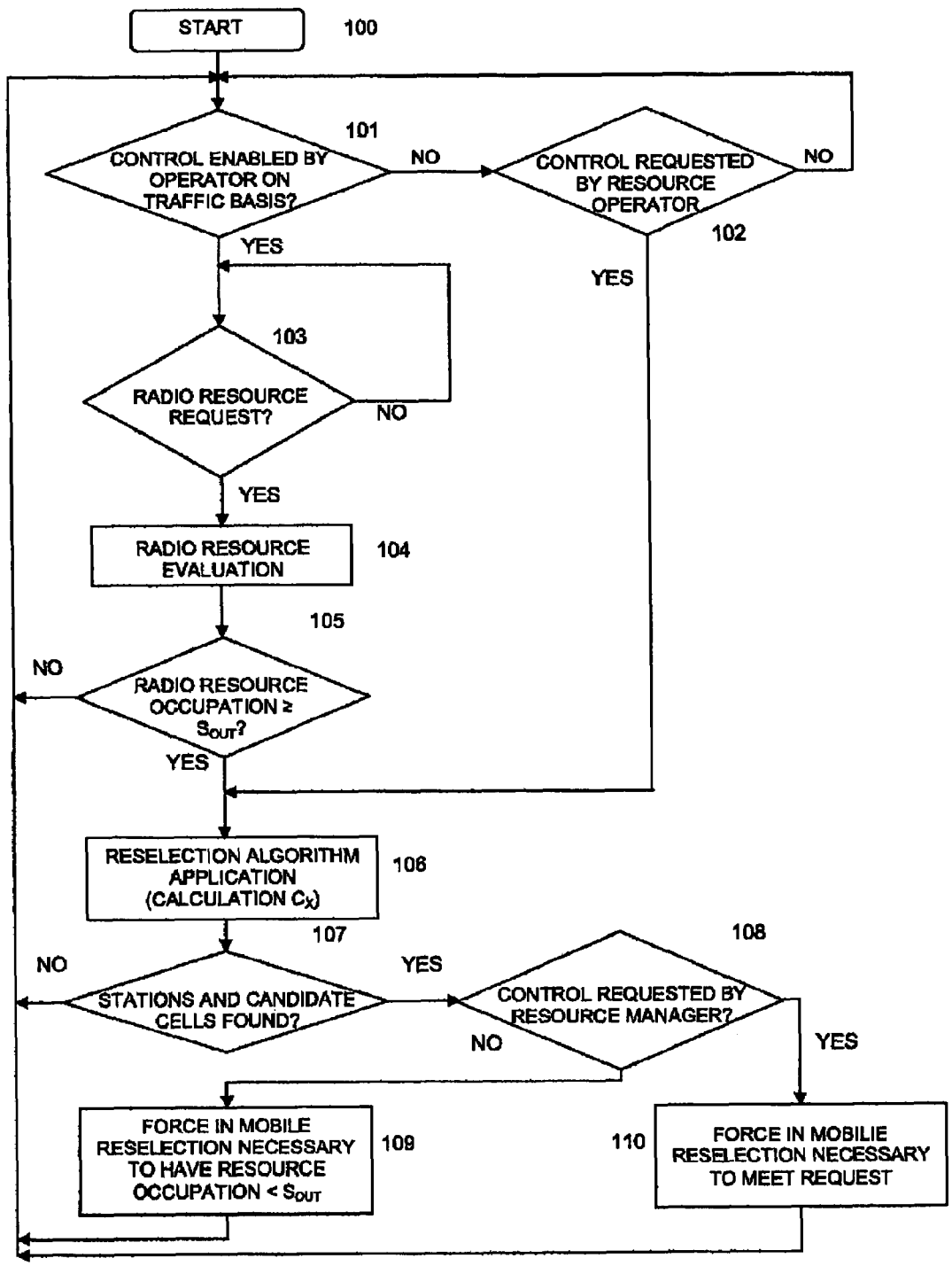
FIG. 2 is a flow chart of the procedure according to the invention.

FIG. 2 shows the flow chart of the procedure according to the invention. The strategy may be enabled for traffic reasons by the operator through the setting of a parameter TR_PS on a cell basis, or may be enabled on request of the radio resource manager. Therefore, after the START 100, there will be two steps 101, 102 to control the value of the operator enabling parameter or the arrival of the request from the radio resource manager. If both the checks are unsuccessful, only the usual reselection procedures foreseen by the GSM specifications shall take place.

Considering first the traffic-based control (successful result of step 101), the traffic thresholds $S_{OUT}$ and $S_{IN}$ are associated to each cell where the procedure has been enabled by the operator: $S_{OUT}$ defines the GPRS traffic level that when reached, a given number mobile stations must operate a cell reselection, while $S_{IN}$ defines the level under which a cell can accept a station that performed the reselection. Both the thresholds are defined as a percent of occupation of the radio resources by the GPRS traffic, and are selected inside the relevant ranges. Suitable values for $S_{IN}$ and $S_{OUT}$ may belong to the ranges [0% 85%] and [50% 100%] respectively.

The evaluation of radio resources occupation (step 104) considers:

the number of configured and operating channels available for the GPRS service (and therefore the resource allocation strategy chosen by the operator, that is resources permanently reserved to the packet switched service or resources dynamically shared with the circuit switched services and drawn according to the need from the common pool of radio resources available in the cell);

the number of mobile stations performing GPRS service, which can be multiplexed in the same time slot in the downlink direction and in the uplink direction.

Considering that a time slot or channel shared by a plurality of mobile stations actually corresponds to a plurality of "virtual time slots (or channels)", the evaluation of the available resources and of busy resources shall be performed considering "virtual time slots". Busy resources are expressed as a percent of those provided for the packet switched service.

Of course, in the calculation of the cell occupation it shall be considered the release of the resources due to conventional reselection in the cell, the presence of mobile stations that can operate on groups of different time slots both in transmission and reception (the so-called "multislot" classes), and the actual time intervals assigned to these mobile stations.

The computation of the level of occupation of the radio resource (step 104) in the cell is triggered by every radio resource request (step 103) and its value is compared with the threshold $S_{OUT}$ (step 105).

For a cell in which the occupation level of radio resources is equal to or higher than the threshold $S_{OUT}$ (control successful at step 105) the network performs the algorithm to identify mobile stations to be forced in cell-reselection and the possible target cells candidate to accept them. (step 106). This re selection algorithm is inspired to the one performed by the mobile stations according to GSM 04.60 and 05.08 specifications and employs parameters related to path loss similar to those ones used in the cell reselection according to the above mentioned specifications. Particularly, if there is no broadcast control channel PBCCH Packet Broadcast Control CHannel) specific for the packet switched service, the parameters C1 (known as path loss criterion parameter) and C2 (known as reselection criterion parameter) are employed whereas, if the PBCCH channel is deployed in the cell, parameters C1, C31 (known as the signal level threshold criterion parameter, used for hierarchical cell structures or HCS) and C32 (known as the cell ranking criterion parameter). These parameters are calculated and employed by the network, starting from the measurements of the reception level periodically supplied by the mobile stations to the base station.

Some preliminary conditions must be satisfied to have results from the reselection algorithm, namely:

the mobile station must be in ready-transfer state the mobile station must report to the network the measurements performed for the cells included in a list supplied by the network;

the network shall signal that reselection is controlled by the network itself, in order to disable the reselection controlled by the mobile station;

the broadcast control channel (BCCH) of the serving cell must be included in the list of BCCH channels of the adjacent cells to be monitored by the mobile station.

the frequency of the measurement reports shall be such to allow the mobile station to perform valid measurements on all the frequencies contained in a BCCH carriers list sent by the network; for instance, the reporting interval could be set for the mobile stations in packet transfer mode, at the value 3,84 s;

in the case of mobile stations involved in data transfer only in downlink, the network shall schedule, on the uplink, an appropriate time slot to allow the sending of measurement reports.

The information exchange between the network and the mobile stations during the algorithm execution is the same as defined by GSM 04.60 and GSM 05.08 specifications.

The reselection algorithm is now described.

Should the PBCCH not be deployed, for each mobile station involved in a packet communication, the network shall calculate the value of the parameters C1 and C2 for the serving cell and for non-serving adjacent cells included in the above-mentioned frequencies list. This calculation is performed each time the mobile station sends the received level average for each carrier (RLA_P=Received Level Average_Packet).

Parameters C1, C2 are calculated according to the following relations:

$$C1 = A - \text{Max}(B, 0); \quad C2 = C1 + \text{CELL\_RESELECT\_OFFSET}$$

where:

A=RLA_P−RXLEV_ACCESS_MIN, where RLA_P has been defined above and RXLEV_ACCESS_MIN is the minimum received signal level at the MS required for access to the system;

B=MS_TXPWR_MAX_CCH−P, where MS_TXPWR_MAX_CCH is the maximum in transmission power level a mobile may use when accessing the system until otherwise commanded and P is the maximum radio frequency output power of the station;

CELL_RESELECT_OFFSET is a value used to determine a selection priority criterion among the destination cells of the reselection or to give different priorities to different bands, in the case of multi-band operation.

CELL_RESELECT_OFFSET is expressed in dB, all the other values, as in the specifications, are expressed in dBm.

The mobile stations candidate to perform reselection are those for which parameter C1 for the serving cell falls below zero, indicating a too high loss, for a pre-set interval of time (e.g. 5 seconds), the same parameter C1 for a monitored adjacent cell is positive, and the C2 value for a monitored adjacent cell exceeds the C2 value of the serving cell, for the same time, of a pre-set quantity (expressed in dB and called CRH or CELL_RESELECT_HYSTERESIS in GSM specifications). This means that there is a better adjacent cell, in terms of radio propagation, than the serving cell.

From a comparison with the formula for the calculation of C1 and C2 given in the GSM 05.08 specification, we see that, according to the present invention, the value of C2 does not include the penalization terms concerning cells to which the mobile unsuccessfully attempted to have access. In fact, for the GPRS service the measures are sent with a frequency that can be lower than the one foreseen for circuit switching services, and also, for reasons due to the scheduling of the access of the station to the network, there can be a delay in the arrival of the measures to the network: therefore it is useless, in a network controlled procedure, to consider events comparatively remote in time, which could be overcome in the meantime. Moreover, keeping also into account the penalization terms in an algorithm performed in the network (and therefore considering all the connected mobile stations), would make the computational load too high.

Should the PBCCH channel be deployed, C1, C31 and C32 parameters are used, as in the specification. Parameters are calculated with the following relations:

C1=A−Max(B,0)

C31 (s)=RLA_P(s)−HCS_THR(s) for the serving cell

C31(n)=RLA_P(n)−HCS_THR(n) for neighbour cells

C32(s)=C1(for the serving cell

C32(n)=C1 (n)+GPRS_RESELECT_OFFSET(n) for neighbour cells.

In these relations:
(s) and (n) indicate the values of the different parameters for the serving cell and the neighbour cells, respectively;
A=RLA_P−GPRS_RXLEV_ACCESS_MIN;
B=GPRS_MS_TXPWR_MAX_CCH−P;
HCS_THR is a signal threshold for applying hierarchical cell structures;
GPRS_RXLEV_ACCESS_MIN, GPRS_MS_TXPWR_MAX_CCH and GPRS_RESELECT_OFFSET are parameters having the same meaning of RXLEV_ACCESS_MIN, MS_TXPWR_MAX_CCH and CELL_RESELECT_OFFSET but specific for the GPRS service, the GPRS_RESELECT_OFFSET value applies an offset and hysteresis value to each cell.

The conditions to be satisfied by a mobile station candidate to reselection are in this case:
C1<0 for the serving cell and C1>0 for at least one neighbour cell;
a suitable neighbour cell with C1>0 is considered better than the serving cell (the evaluation criterion is similar to that mentioned above for C2); the best cell is the one having the highest value of the C32 parameter.

If cells having hierarchical structure are present, then the best cell is the one having the highest value of parameter C32 among cells having the highest priority class among those fulfilling the criterion C31 ≧0, or among all the cells, if no cells fulfil the criterion C31≧0. If there is not a hierarchical structure, of course C31 is not considered.

In the determination of the best cell, it is necessary also to subtract some hysteresis values from the calculated-value of C32(n), and namely a value RA_CRH, if the best cell belongs to a different routing area RA, or a GPRS_CRH value, if the new cell belongs to the same routine area. This value must also be subtracted from C31 (n) if a hysteresis parameter C31_HYST, used to promote the shifting of mobile stations inside the area with a given priority logic, is set.

The comparison with the expression for the calculation of parameters C31, C32 contained in GSM 05.08 specification shows that also in this case, the invention does not consider penalty terms for adjacent cells.

In conclusion, for each cell where the traffic based control is enabled, the algorithm identifies possible mobile stations candidate to perform cell reselection towards a suitable adjacent cell and cells that, from the radio and traffic conditions point of view, are possible candidates to receive these stations. In addition, among these candidate cells, a cell will be considered suitable if it accepts the GPRS service and has occupation level of the radio resources lower than SIN. If candidate stations and cells are found (positive result of step 107), the identity of candidate cell is stored and the mobile station is included in a list of stations available for reselection. This list is ordered according to C2 or of C32/C31 values. The order shall be for instance according to decreasing values. The stations with the highest values shall be the main candidates. If there are identical values, other parameters could be considered: e.g. priority could be given to stations whose communication has the lowest priority level from the service quality point of view.

At this point, the network forces the cell reselection of a cell for such a number of mobile stations to release the radio resources necessary to bring the level of occupation under the threshold $S_{OUT}$ (step 109). It is supposed that a request for quality of service reasons for the cell is not active, and therefore that the comparison of step 108 gives negative result. However, if the request for quality of service reasons concerned a cell for which the traffic-based reselection procedure is in progress, the latter shall prevail as we shall see also later on.

The network sends the cell change order to the concerned stations, with the indication of the destination cell, as required by GSM specifications. Said order can be accompanied by the request of immediate release of the resource, for the same reasons indicated by the specifications.

In the case of traffic control strategy activated by the resource control units (successful result of step 102), the request will be sent when the mobile station tries to establish the connection in the cell and it will contain the indication of the resources necessary to satisfy the quality of service requirements, e.g. number of requested contiguous time slots. The cell involved in the request shall of course be the one identified with the cell selection procedure performed to establish the connection. The preliminary conditions are the same as already described.

As already said, the traffic control procedure may be activated by request of the radio resources control units. Two cases may happen.

In the first case, the strategy has not been enabled in the cell by the operator: the network will immediately proceed to the application of the reselection algorithm of step 106, without evaluating the resource occupation. If step 107 gives a positive result, that is candidate base stations and cells are found, the network forces the reselection, if possible, of as many mobile stations as are necessary to satisfy the quality if service requirements (step 112). Also in this case there is the possibility of immediate release of the resources, as already described.

In the second case, if the control on traffic basis has been enabled by the operator, it must also be distinguished if the occupation of radio resources reached the threshold $S_{OUT}$ or not. In negative case, we proceed as in the previous case. In the positive case, the request is not accepted, because the reselection procedure of cell forced by the network on the traffic basis is already running.

Though the invention is described referring to its preferred embodiment, it is evident that variants and modifications may be made by those skilled in the art without departing from the following claims. In particular, even if specific reference was made to the GPRS service, the invention can be used also in the enhanced GPRS service (EGPRS or Enhanced GPRS) and in packet switched services of other systems, such as the UMTS.

We claim:

1. A method for controlling packet switched data traffic in digital cellular communication systems, in which a cell reselection is forced, said cell reselection being controlled by network control units of mobile stations engaged in packet switched calls and identified in a search step in which the control units evaluate path loss levels of signals relevant to communication of the mobile stations engaged in these calls with both a base station of a respective serving cell and base stations of a plurality of cells contiguous to a serving cell, said method comprising the steps of:

a) jointly determining, for each one of the mobile stations in a involved cell, at least a first and a second parameter related to path loss for both communication with the base station of the serving cell and communication with the base stations of said plurality of contiguous cells;
b) including mobile stations for which both of said parameters indicate a degradation of communication with the base station of the serving cell and a good quality of communication with a base station of at least a contiguous cell, into a list candidates mobile stations to receive a reselection command from said control units;
c) associating, with each candidate station in said list, an identity of one or more contiguous cells identified as possible target cell or cells for the station in step b); and
d) forcing a reselection of a candidate mobile station towards one of the contiguous cells which supports packet switched service and has an occupation level of radio resources involved in packet switched traffic not higher than a first threshold, set by a network operator and typical of the cell;
wherein the search is enabled in a cell by either:
reaching or exceeding in the cell a second threshold, higher than the first threshold of occupation of radio resources invoked in packet switched traffic, the second threshold being set by the network operator and being specific for each cell; or
a specific request to release a given mount of radio resources, supplied by a radio resources control unit and due to quality-of-service requirements, for a cell candidate to accept a mobile station that shall establish a new packet switched call.

2. The method according to claim 1, wherein the packet switched data service is a GPRS service or an Enhanced GPRS for a GSM system, wherein predetermined parameters are used as the first and second parameters and are evaluated in the control units when the involved mobile stations report signal level measurements to the base station, wherein a predetermined parameter C1 and a predetermined parameter C32 are used as the first and second parameters, respectively, if a broadcast contol channel PBCCH is allocated in the involved cell, wherein the predetermined parameter C1 and a predetermined parameter C32 are used as the first and second parameters, respectively, if a broadcast control channel PBCCH is not allocated, wherein the predetermnined parameters correspond to homonymous parameters used according to international standards relevant to GPRS service for the cell reselection controlled by the mobile stations, and wherein first and second parameters indicative of a degradation in reception in the serving cell and a good quality of reception in the adjacent cells are determined in accordance with cell reselection controlled by mobile stations.

3. The method according to claim 2, wherein the second parameter C2 or C32 is calculated, for the possible target cells, without considering penalty terms relevant to unsuccessful access attempts to one of the contiguous cells.

4. The method according to claim 2, wherein, for cells to which the packet broadcast control channel PBCCH is assigned and for which there is a hierarchical structure of cells, a value of a third parameter comprising aa parameter C31 corresponding to the homonymous parameter used according to the international standards relevant to the GPRS service is evaluated both for the communication with the base station of the serving cell and for the communication with the base stations of the adjacent cells, the third parameter being evaluated by the control units substantially simultaneously to the first and second parameter and being determined in accordance with the cell reselection controlled by the mobile stations.

5. The method according to claim 4, wherein the candidate mobile stations for which cell reselection is actually to be forced are selected according to one of:
a decreasing order of the value of the second parameter,
a ratio of the second and third parameter, and
in case of an equal value of the parameter or of the ratio, an increasing order of a priority level from a quality-of-service point of view.

6. The method according to claim 1, wherein the first threshold is included between 0% and 85% of the radio resources provided for the packet swithching service.

7. The method according to claim 1, wherein the second threshold is included between 50% and 100% of radio resources provided for the packet swithching service.

8. The method according to claim 6, wherein comparison between the occupation level of radio resources engaged for the packet swithched service and the second threshold is triggered at every radio resource request in a cell.

9. The method according to claim 1, wherein a comparison with the second threshold is made in cells for which the operator brought a parameter enabling the packet traffic control strategy to a pre-set value.

10. The method according to claim 1, wherein, for a cell for which the search is started by reaching or exceeding the second threshold, the forcing step includes forcing reselection for one of:
a number of candidate mobile stations so as to bring the occupation level of the radio resources engaged for the packet swithched service in the cell, below the second threshold, and
all mobile stations, if the resources that can be released through reselection are not sufficient to bring the occupation level below the second threshold.

11. The method according to claim 1, wherein the request due to quality-of-service requirements concerns a cell for which the traffic control is not enabled, and wherein the forcing step includes forcing reselection for one of:
a number of mobile stations operating in the cell so as to meet the quality-of-service requirements for the cell,
all mobile stations for which the reselection is possible, if the resources that can thus be released in the cell are not sufficient to meet the requirements.

12. The method according to claim 1, wherein the request due to quality-of-service requirements concerns a cell for which traffic control is enabled wherein before the search, a comparison is made between the occupation level of the cell radio resources and the second threshold; the request is processed only for the cells having an occupation level lower than the threshold; and wherein the forcing step includes forcing reselection for one of;
a number of mobile station in the cell so as to meet the quality-of-service requirements specified into request, and
all mobile stations for which the reselection is possible, if the resources that can thus be released in the cell are not sufficient to meet the requirements.

* * * * *